United States Patent
Mack-Crane et al.

(10) Patent No.: US 9,647,876 B2
(45) Date of Patent: May 9, 2017

(54) LINKED IDENTIFIERS FOR MULTIPLE DOMAINS

(71) Applicant: Futurewei Technologies, Inc., Plano, TX (US)

(72) Inventors: T. Benjamin Mack-Crane, Downers Grove, IL (US); Susan Kay Hares, Saline, MI (US); Charles E. Perkins, Saratoga, CA (US)

(73) Assignee: Futurewei Technologies, Inc., Plano, TX (US)

( * ) Notice: Subject to any disclaimer, the term of this patent is extended or adjusted under 35 U.S.C. 154(b) by 658 days.

(21) Appl. No.: 14/059,055

(22) Filed: Oct. 21, 2013

(65) Prior Publication Data

US 2014/0115154 A1    Apr. 24, 2014

Related U.S. Application Data

(60) Provisional application No. 61/716,933, filed on Oct. 22, 2012.

(51) Int. Cl.
| | |
|---|---|
| *G06F 15/173* | (2006.01) |
| *H04L 12/24* | (2006.01) |
| *H04L 12/26* | (2006.01) |
| *H04L 29/12* | (2006.01) |
| *H04L 12/915* | (2013.01) |

(52) U.S. Cl.
CPC ............ *H04L 41/022* (2013.01); *H04L 41/12* (2013.01); *H04L 43/0811* (2013.01); *H04L 47/785* (2013.01); *H04L 61/106* (2013.01); *H04L 61/6004* (2013.01); *H04L 61/605* (2013.01)

(58) Field of Classification Search
CPC ............................ H04L 43/0811; H04L 41/12
See application file for complete search history.

(56) References Cited

U.S. PATENT DOCUMENTS

| | | | |
|---|---|---|---|
| 2007/0245033 A1 | 10/2007 | Gavrilescu et al. | |
| 2009/0116404 A1* | 5/2009 | Mahop | H04L 41/0213 370/254 |
| 2010/0138560 A1* | 6/2010 | Kivinen | H04L 12/4633 709/246 |
| 2011/0292832 A1* | 12/2011 | Bottari | H04L 41/0896 370/254 |

(Continued)

FOREIGN PATENT DOCUMENTS

EP    2501077 A1    9/2012

OTHER PUBLICATIONS

Foreign Communication From a Counterpart Application, PCT Application No. PCT/US2013/065949, International Search Report dated Jan. 24, 2014, 7 pages.

(Continued)

*Primary Examiner* — Jason Recek
(74) *Attorney, Agent, or Firm* — Conley Rose, P.C.

(57) ABSTRACT

A method for providing a link identifier (LID), wherein the method comprises obtaining a first identifier block (IDB) that identifies an external interface within a first domain using a first identifying scheme, obtaining a second IDB that identifies a second external interface within a second domain using a second identifying scheme, creating the LID that comprises the first IDB and the second IDB, and advertising the LID to one or more external entities.

20 Claims, 7 Drawing Sheets

(56) References Cited

U.S. PATENT DOCUMENTS

| | | | |
|---|---|---|---|
| 2012/0236757 A1* | 9/2012 | Klein | H04L 41/12 370/255 |
| 2012/0239794 A1 | 9/2012 | Klein | |
| 2013/0254328 A1* | 9/2013 | Inoue | H04L 29/08 709/217 |

OTHER PUBLICATIONS

Foreign Communication From a Counterpart Application, PCT Application No. PCT/US2013/065949, Written Opinion dated Jan. 24, 2014, 7 pages.
"P1905.1/D05 Draft Standard for a Convergent Digital Home Network for Heterogeneous Technologies," IEEE Communications Society, IEEE P1905.1/D05, May 5, 2012, 82 pages.
Roberts, et al., "NSI Connection Service v2.0", Open Grid Forum, GWD-R-P, Jul. 29, 2013, 21 pages.
Roberts, et al., "Network Services Framework v1.0", Open Grid Forum, GFD.173, Dec. 15, 2010, 95 pages.

* cited by examiner

LINKED IDENTIFIERS FOR MULTIPLE DOMAINS

CROSS-REFERENCE TO RELATED APPLICATION

The present application claims priority to U.S. Provisional Patent Application No. 61/716,933 filed Oct. 22, 2012 by T. Benjamin Mack-Crane, et al. and entitled "Linked Identifiers," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Historically, communication and data networks have been configured by systems, such as network management systems or element management systems, located within one administrative domain or using common control protocols implemented across multiple domains. The systems may employ a variety of identification schemes used to identify resources, such as nodes, ports, and flows, within the domains for the purpose of local management control. Typically, the systems may implement identification schemes that differ from one domain to the next. Alternatively, in some networks, the identification schemes may be standardized across multiple domains using control protocols or determined from context. As a result, each domain is configured to support common identification schemes.

With the advent of cross-domain service provisioning and service orchestration systems that provide centralized control, modern networks may need to identify resources in domains that implement distinct identification schemes. For example, a service orchestration system may coordinate service requests to multiple providers that include a cloud service provider, a telecommunications service provider, and an enterprise network manager to establish a desired service instance, such as an enterprise cloud computing service. The service requests may identify service points within the domains that are controlled by the different service providers or administrative entities. Each service provider may implement a unique scheme for identifying relevant service points in and/or at the boundary of their domains. For instance, a cloud service provider may use Internet Protocol (IP) addresses to identify external ports to the Internet or other service networks such as Carrier Ethernet Networks. A telecommunications service provider may use phone numbers or Common Language Location Identifier (CLLI) codes combined with equipment specific schemes to identify service endpoints in their network. Unfortunately, selecting a common identification scheme for all the domains to support and upgrading all the domains to support the selected identification scheme is often too costly and economically unfeasible.

SUMMARY

In one embodiment, the disclosure includes a method for providing a link identifier (LID), wherein the method comprises obtaining a first identifier block (IDB) that identifies an external interface within a first domain using a first identifying scheme, obtaining a second IDB that identifies a second external interface within a second domain using a second identifying scheme, creating the LID that comprises the first IDB and the second IDB, and advertising the LID to one or more external entities.

In another embodiment, the disclosure includes an apparatus for coordinating service requests across a plurality of domains, comprising a memory, a processor coupled to the memory, wherein the memory includes instructions that when executed by the processor cause the apparatus to perform the following: receive a first LID from a first domain, receive a second LID from a second domain, compare the first LID and the second LID, determine whether the first LID and the second LID match, and forward the first LID to the first domain and the second domain when the first LID and the second LID match, wherein the first LID and the second LID identify an external interface within the first domain and a second external interface within the second domain when the first LID and the second LID match.

In yet another embodiment, the disclosure includes an apparatus for processing a LID within a domain, comprising a memory, a processor coupled to the memory, wherein the memory includes instructions that when executed by the processor cause the apparatus to perform the following: receive the LID that comprises a plurality of IDBs, search for an IDB within the LID that identifies the domain, and decode the IDB to identify an external interface using an identification scheme, wherein the identification scheme is unable to decode a second IDB within the LID.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems, apparatuses, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Disclosed herein are at least one method, apparatus, and system that coordinate service requests across a plurality of domains with independent domain identification schemes. A management entity and/or other network nodes within a domain may create domain-specific IDBs and link the IDBs from different domains to form LIDs. The LIDs may be used to identify related resources (e.g. interconnected external interfaces) in the different domains. Specifically, an IDB may comprise a domain identifier and a resource identifier used to identify resources within a domain, while LIDs may concatenate two or more IDBs from different domains. An entity outside the domains, such as a service orchestration entity, may use the LIDs to coordinate service requests over the domains without understanding and/or decoding the domain's identifiers. Cryptographic encryptions and authentication of the IDBs may be used to prevent entities outside the domain from decoding the domain's identifiers. Additionally, cryptographic encryptions and authentication of the LIDs may be used to validate linkage between IDBs.

Figure 1:
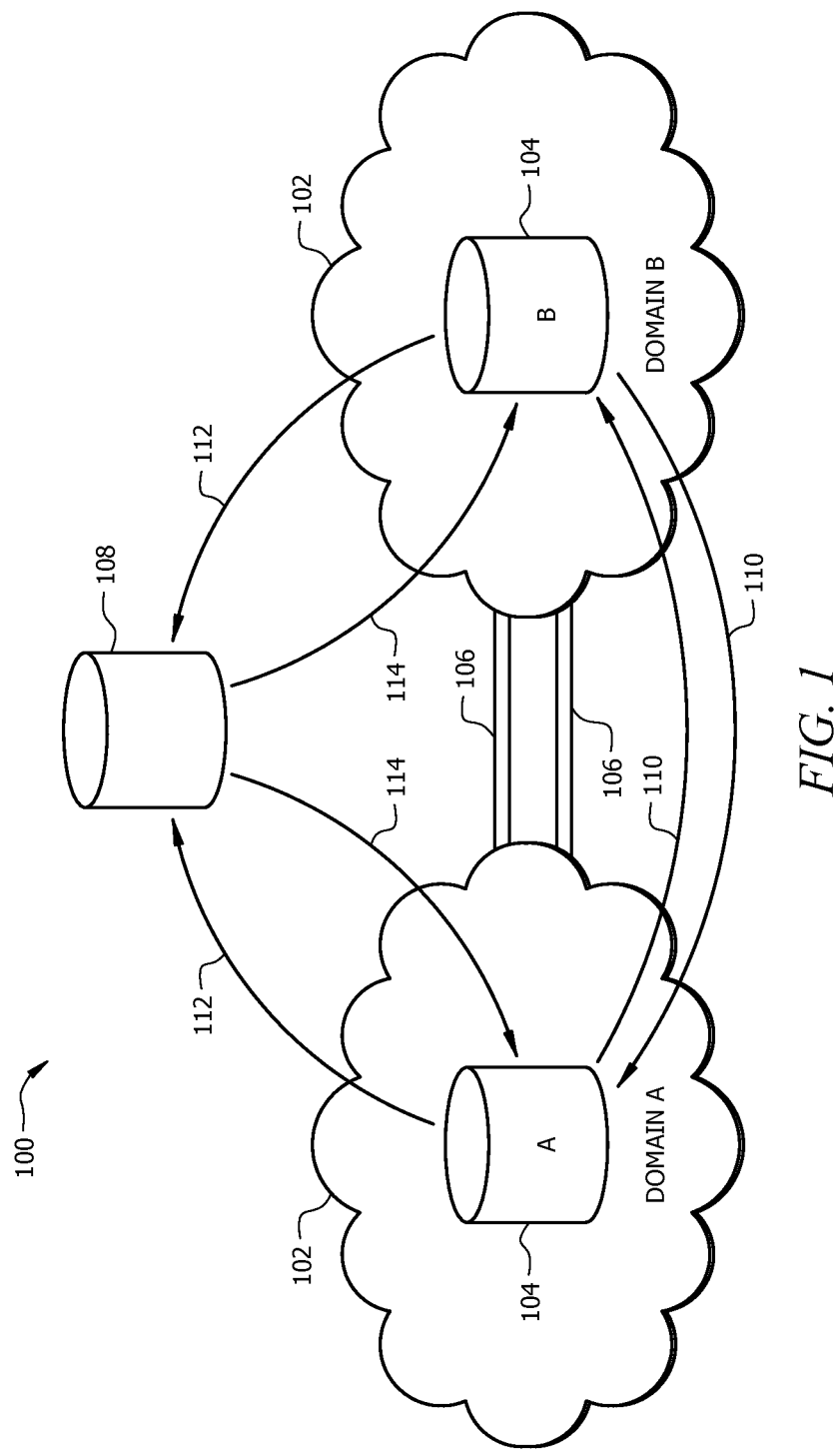
FIG. 1 is a schematic diagram of an embodiment of a system comprising two domains and an external entity where embodiments of the present disclosure may operate.

FIG. 1 is a schematic diagram of an embodiment of a system 100 where embodiments of the present disclosure may operate. System 100 may comprise domains A and B 102 and an external entity 108 located outside both domains 102. One or more connections 106 may interconnect domains A and B 102 within system 100. Each domain 102 may be a network and/or a portion of a network that is under the control of a management entity 104. For example, domain 102 may be a Software Defined Networking (SDN) domain managed by a SDN controller. The external entity 108 may be a server orchestration system, a service broker, a client system, and/or any other network device configured to coordinate connectivity across a plurality of domains. Connections 106 may include physical connections, such as fiber optic links, electrical links, and wireless links, and/or logical connections. Connection 106 may comprise a single link, a series of parallel links, a plurality of interconnected nodes (not shown in FIG. 1), or various combinations thereof used to transport data between domains A and B 102.

Each domain 102 may comprise a management entity 104 that may be centrally located within the domain 102. Management entity 104 may be centrally located within domains 102 physically and/or logically. FIG. 1 illustrates that management entity A 104 is located within domain A 102, while management entity B 104 is located within domain B 102. Management entity 104 may be a management system, a control system, a SDN controller, and/or any other network device or combination of network devices that are configured to perform a variety of control plane and management functions that include, but are not limited to, obtaining routing information, network topology, and network state information. In one embodiment, the management entity 104 may also be configured to create, store, authenticate, and/or encrypt IDBs and/or LIDs for the domain 102 controlled by the management entity 104. In another embodiment, the management entity 104 may receive advertised IDBs and/or other IDB related information from other network nodes, such as switches and routers, within the domain 102 controlled by the management entity 104. Using FIG. 1 as an example, management entity A 104 may receive IDBs advertised by network nodes located within domain A 102. Management entity A 104 may subsequently use the IDBs to construct LIDs that pertain to domain A 102. Additionally, management entity A 104 may encrypt and authenticate IDBs and LIDs created in domain A 102.

FIG. 1 illustrates that management entities A and B 104 and external entity 108 may exchange IDBs and LIDs. Management entities A and B 104 may exchange IDBs with each other via IDB messages 110. In one embodiment, the IDBs may be exchanged via a protocol, such as a link discovery protocol. Examples of link discovery protocols may include, but are not limited to Institute of Electrical and Electronics Engineers (IEEE) 802 Link Layer Discovery Protocol (LLDP) and the Internet Engineering Task Force (IETF) Link Management Protocol (LMP). Other embodiments may exchange the IDBs using other communication mechanisms, such as over the phone or via email. The management entities 104 may then use the IDBs from the other domain 102 to construct LIDs and encode the LIDs into LID messages 112. In one embodiment, the LID messages 112 and IDB messages 110 may encode the LIDs and IDBs using type-length-value (TLV) structures that are commonly used in telecommunication control protocols. Each of the management entities 104 may then advertise LID message 112 to external entity 108. The external entity 108 may be one of the entities that requests services from domains A and B 102. Once the external entity 108 receives the LID message 112, the external entity 108 may subsequently send (e.g. transmit) service requests 114 that provide at least one of the LIDs obtained from LID messages 112.

As persons of ordinary skill in the art are aware, although FIG. 1 illustrates the use of one external entity 108 and two domains 102, the disclosure is not limited to that application. For instance, the management entity 104 and/or other network nodes within the domains 102 that are responsible for creating and/or storing LIDs may advertise LIDs to more than one external entity 108 that request services from domains 102. Moreover, external entity 108 may request services from one or more domains 102 and may receive LIDs from those domains 102. The use and discussion of FIG. 1 is only an example to facilitate ease of description and explanation.

Figure 2:
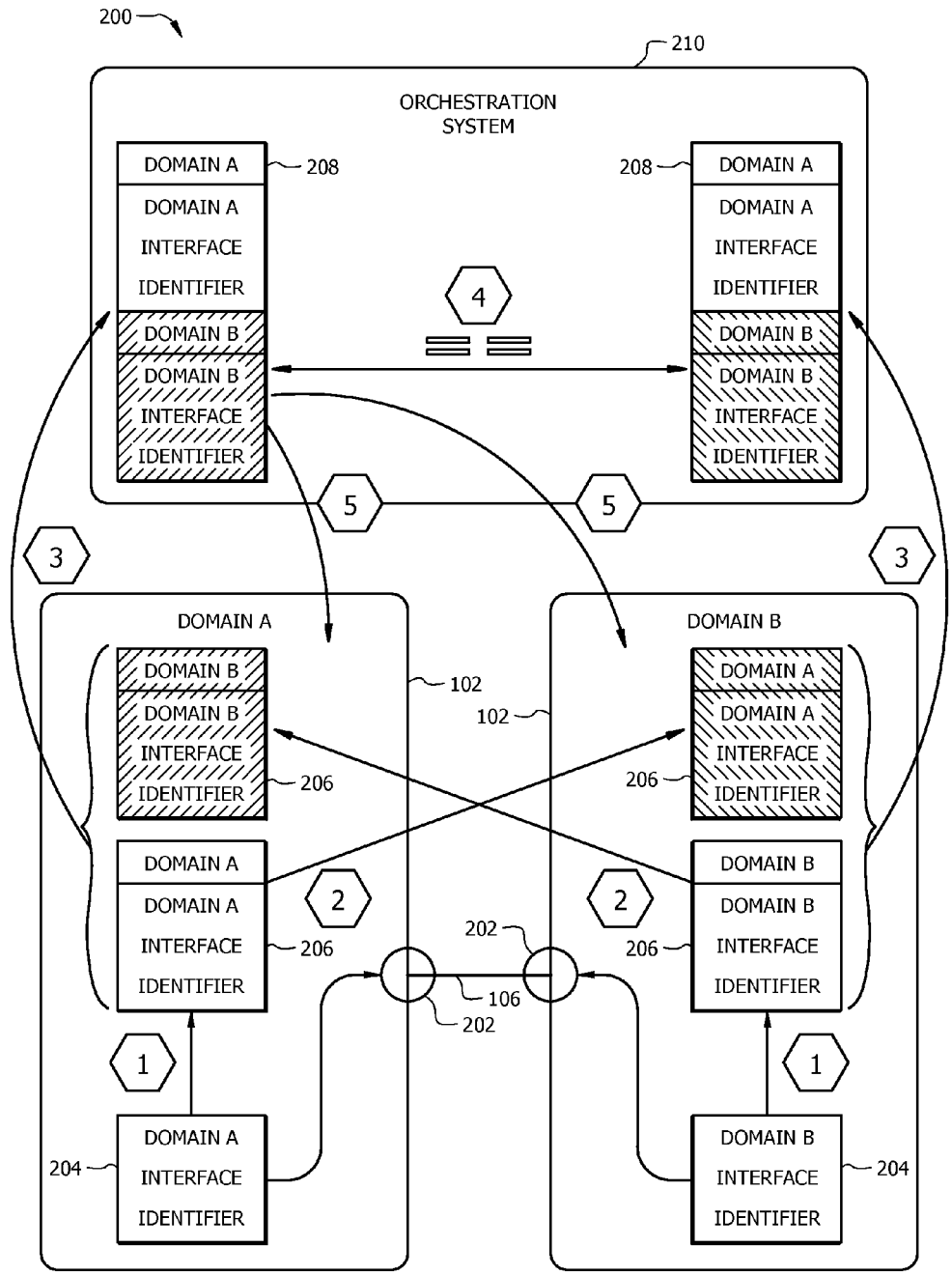
FIG. 2 is a schematic diagram of an embodiment of a system that creates and exchanges IDBs and LIDs.

FIG. 2 is a schematic diagram of an embodiment of a system that creates and exchanges IDBs and LIDs. As shown in FIG. 2, domains A and B 102 may be interconnected via connection 106. The ends of connection 106 may be external interfaces 202, such as ports and/or nodes, located at the edge or boundary of a domain 102. The external interfaces 202 may be an interface configured to facilitate communication outside a domain 102. In other words, the external interface 202 located in domain A 102 may transmit and receive data from entities and/or nodes located outside of domain A 102. In FIG. 2, the external interface 202 located in domain A 102 may receive data from the external interface 202 located in domain B 102. System 200 also comprises an orchestration system 210 that acts as an external entity that coordinates connectivity (e.g. establish a service instance) across domains A and B 102.

Domains 102 may use one or more identification schemes to identify the external interface 202 to produce domain interface identifiers 204. Domains A and B 102 may use identification schemes that differ from each other to identify resources, such as external interfaces 202. For example, domain B 102 may not use the identification scheme used by domain A 102 to identify the external interface 202 located within domain B. The identification schemes used by domains 102 may be any identification scheme that is well-known in the art. The identification schemes within domains 102 may generate a domain interface identifier 204 that represents a value used to identify the external interface 202. For example, domain A 102 may use an IP address as the domain A interface identifier 204 to identify the external interface 202 located within domain A 102, while domain B 102 may use a phone number as the domain B interface identifier 204 to identify the external interface 202 located within domain B 102. In one embodiment, a domain interface identifier 204 may be assigned to a plurality of different resources (e.g. multiple external interfaces 202) within a domain.

FIG. 2 illustrates the process of creating IDBs 206 and LIDs 208, and exchanging them amongst the domains 102 and orchestration system 210. As shown in FIG. 2, after a domain 102 obtains the domain interface identifier 204, each domain 102 may create an IDB 206 for the external interfaces 202 in step 1. An IDB 206 may be created by adding a domain part to the domain interface identifier 204. At step 2, each of the IDBs 206 may be exchanged between domains A and B 102 via a protocol (e.g. link discovery protocol). Each of the IDBs 206 in FIG. 2 may correspond to one of the external interfaces 202. Specifically, IDB 206 for domain A 102 may be used to identify the external interface 202 located within domain A 102, and IDB 206 for domain B 102 may be used to identify external interface 202 located within domain B 102. IDB 206 for domain A 102 may be transmitted to domain B 102, while IDB 206 for domain B 102 may be transmitted to domain A 102 during step 2's exchange process.

After exchanging the IDBs 206, the domains 102 may create LIDs 208 by concatenating their own IDB 206 with the IDB 206 received from the other domain 102. In FIG. 2, both domains 102 concatenate the IDB 206 from domain A 102 with the IDB 206 from domain B 102 to form LIDs 208. LIDs 208 may identify the external interfaces 202 for connection 106, which links together domains A and B 102. As such, LIDs 208 may be used to identify connection 106 and each domain's boundary point in reference to a service order. In one embodiment, the LIDs 208 may be concatenated by combining the IDBs 206 in lexicographical order. For example, the LIDs 208 may concatenate IDBs 206 by placing the IDB 206 with the lower bit value in front of the IDB 206 with a higher bit value. Additionally, if the IDBs 206 are encoded as text, the IDBs 206 may be arranged in alphabetical order. Other embodiments may use other well-known methods in the art to concatenate the IDBs 206 to form LIDs 208. At step 3, the domains 102 may provide (e.g. advertise) the LIDs 208 to the orchestration system 210. Domains 102 may use a management entity 104 as discussed in FIG. 1 and/or other network nodes to advertise, obtain, and/or store the domain interface identifiers 204 assigned to the external interfaces 202, the IDBs 206, and the LIDs 208.

At step 4, the orchestration system 210 may receive the LIDs 208 and compare the LIDs 208 received from domains A and B 102. By comparing the LIDs 208, the orchestration system 210 may determine whether domains A and B 102 are linked together based on whether the LIDs 208 match. If the LIDs 208 received from domains A and B 102 match, then the orchestration system 210 may determine that the domains 102 are linked together. In other words, the orchestration system 210 may use LIDs 208 received from domains 102 to construct the inter-domain topology (e.g. the topology formed from interconnecting domains) for system 200. In one embodiment, the orchestration system 210 may not interpret and/or understand the information within the LID 208. For example, the orchestration system 210 may not decrypt the LIDs 208 and/or map the domain interface identifiers 204 to an external interface within the domains. Instead, the orchestration system 210 may compare the LIDs by performing a bit-by-bit comparison of the LIDs 208.

At step 5, the orchestration system 210 may send (e.g. transmit) service requests to the domains 102 when the orchestration system 210 starts to coordinate connectivity for a service that traverses through connection 106 and/or domains A and B 102. The service requests may comprise one of the LIDs 208 that were advertised in step 3. The orchestration system 210 may send the service request when the orchestration system 210 determines that the LIDs 208 advertised in step 3 match each other. As discussed above, the orchestration system 210 may determine whether the LIDs 208 match in step 4. The service request may provide LID 208 to domains A and B 102 to identify service endpoints.

Once the domains 102 receive the service request, each domain 102 may interpret its own IDB 206 within the LID 208 to identify the external interface 202 referenced by the service request. Using FIG. 2 as an example, domain A 102 may find the IDB 206 that pertains to domain A 102 within the LID 208. Domain A 102 may identify the network interface 202 that act as one of the endpoints for connection 106. Domain A 102 may not interpret the IDBs 206 that pertain to domain B 102 or other domains within LID 208. Step 5 in FIG. 2 may be performed by a management entity 104 as discussed in FIG. 1 and/or other network nodes within the domains 102.

Figure 3:
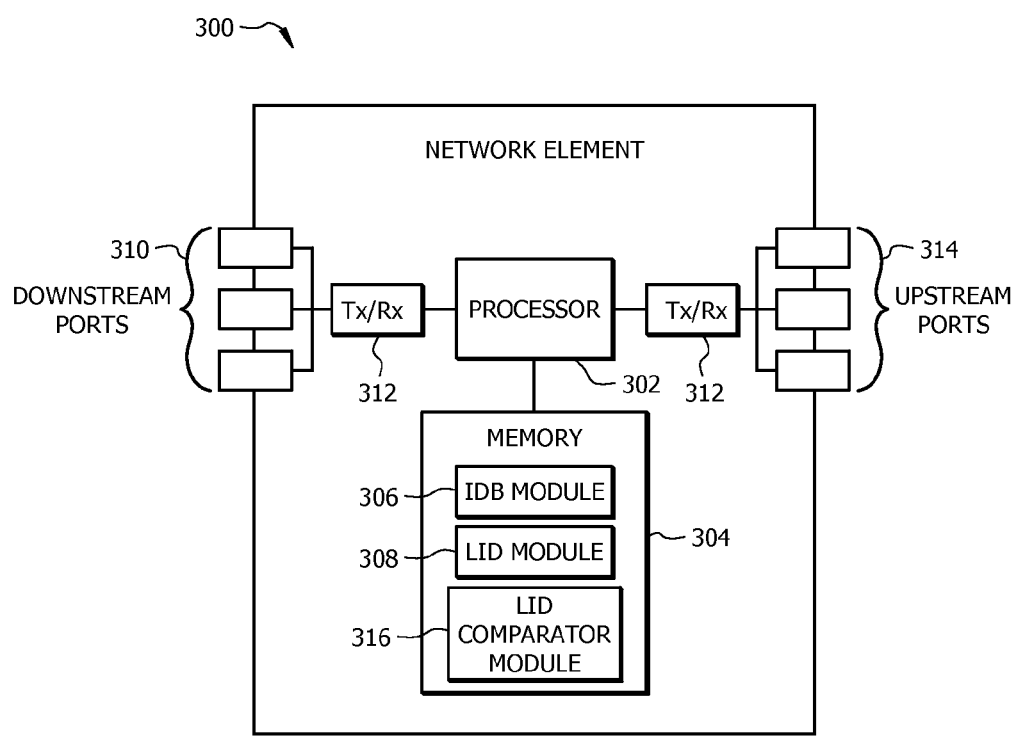
FIG. 3 is a schematic diagram of an embodiment of a network element.

At least some of the features/methods described in the disclosure may be implemented in a network element. For instance, the features/methods of the disclosure may be implemented using hardware, firmware, and/or software installed to run on hardware. The network element may be any device, e.g., a switch, router, bridge, server, client, etc. that transports data through a network, system, and/or domain. FIG. 3 is a schematic diagram of an embodiment of a network element 300 that may be used to transport and process data through a network and systems 100 and 200 shown in FIGS. 1 and 2. In one embodiment, the network element 300 may be any apparatus used to create, store, encrypt, authenticate, transmit, and/or receive IDBs. The network element 300 may also be any apparatus used to create, store, encrypt, authenticate, transmit, and/or receive LIDs. For example, network element 300 may be a management entity 104 as described in FIG. 1. In another embodiment, network element 300 may be configured to receive and compare LIDs, such as the external entity 108 in FIG. 1 and the orchestration system 210 in FIG. 2.

The network element 300 may comprise one or more downstream ports 310 coupled to a transceiver (Tx/Rx) 312, which may be transmitters, receivers, or combinations thereof. The Tx/Rx 312 may transmit and/or receive frames from other network nodes via the downstream ports 310. Similarly, the network element 300 may comprise another Tx/Rx 312 coupled to a plurality of upstream ports 314, wherein the Tx/Rx 312 may transmit and/or receive frames from other nodes via the upstream ports 314. The downstream ports 310 and/or upstream ports 314 may include electrical and/or optical transmitting and/or receiving components.

A processor 302 may be coupled to the Tx/Rx 312 and may be configured to process the frames and/or determine which nodes to send (e.g. transmit) the frames. In one embodiment, processor 302 may comprise one or more multi-core processors and/or memory modules 304, which may function as data stores, buffers, etc. The processor 302 may be implemented as a general processor or may be part of one or more application specific integrated circuits (ASICs) and/or digital signal processors (DSPs). Although illustrated as a single processor, the processor 302 is not so limited and may comprise multiple processors. The processor 302 may be configured to implement any of the schemes described herein, including methods 900 and 1000 as described in FIGS. 9 and 10, respectively.

FIG. 3 illustrates that memory module 304 may be coupled to the processor 302 and may be a non-transitory medium configured to store various types of data. Memory module 304 may comprise memory devices including secondary storage, read only memory (ROM), and random access memory (RAM). The secondary storage is typically comprised of one or more disk drives, solid-state drives (SSDs), and/or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 304 may be used to house the instructions for carrying out the system and methods described herein, e.g., as a management entity 104, external entity 108, orchestration system 210, etc. In one embodiment, the memory module 304 may comprise an IDB module 306 that may be implemented on the processor 302. Alternately, the IDB module 306 may be implemented directly on the processor 302. The IDB module 306 may be configured to create, encrypt, authenticate, and/or store IDBs. Creating, encrypting and authenticating IDBs will be discussed in more detail in FIGS. 11-13. In another embodiment, the memory module 304 may also comprise a LID module 308 that may create, encrypt, authenticate, and/or store LIDs. Creating, encrypting, and authenticating LIDs will be discussed in more detail in FIGS. 14-15. In another embodiment, the memory module 304 may comprise a LID comparator module 316 that may be configured to compare and determine whether LIDs from different domains match as discussed in step 4 of FIG. 2 and method 1000 in FIG. 10.

It is understood that by programming and/or loading executable instructions onto the network element 300, at least one of the processor 302, the cache, and the long-term storage are changed, transforming the network element 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
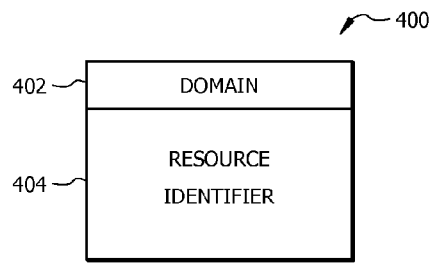
FIG. 4 is a schematic diagram of an embodiment of an IDB comprising a domain identifier and a resource identifier.

FIG. 4 is a schematic diagram of an embodiment of an IDB 400. The IDB 400 may comprise a domain identifier 402 and a resource identifier 404. The resource identifier 404 may be an assigned value used to identify one or more resources within a domain. The format of the resource identifier 404 may be known to the domain using one or more identification schemes. Embodiments of the resource identifier 404 may include IP addresses, phone numbers, CLLI codes, and/or any other well-known identifier formats used within a domain. The domain interface identifier 204 discussed in FIG. 2 is another example embodiment of the resource identifier 404.

The domain identifier 402 may be used to identify the domain associated with the resource identifier 404. In instances where the resource identifiers 404 for multiple domains match in value, the domain identifier 402 may be used to distinguish which resource identifiers 404 correspond to which domains. In one embodiment, the domain identifier 402 may be allocated from a global namespace (e.g. a public identifier), such as Autonomous System Numbers or Carrier Identification Codes. In another embodiment, the domain identifier 402 may be a private identifier (e.g. not a public identifier) that may uniquely identify the domain that generated the IDB 400 within a private context.

Figure 5:
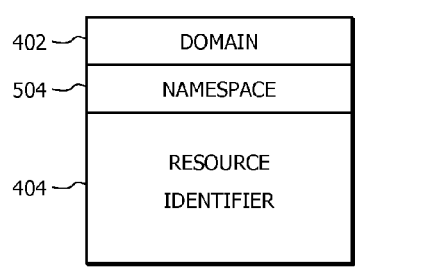
FIG. 5 is a schematic diagram of an embodiment of an IDB comprising a namespace field.

FIG. 5 is a schematic diagram of another embodiment of an IDB 500. IDB 500 may be used when a domain uses more than one identification scheme to identify resource identifiers 404. IDB 500 may comprise the domain identifier 402, a namespace field 504, and a resource identifier 404. The namespace field 504 may indicate the namespace within a domain that corresponds to the resource identifier 404. For example, a domain may have an IP namespace that use IP addresses as resource identifiers 404 and a text namespace that uses text (e.g. CLLI codes) as resource identifiers 404. The namespace field 504 may be used to distinguish resource identifiers 404 that belong to the IP namespace from resource identifiers 404 that belong to the text namespace.

Figure 6:
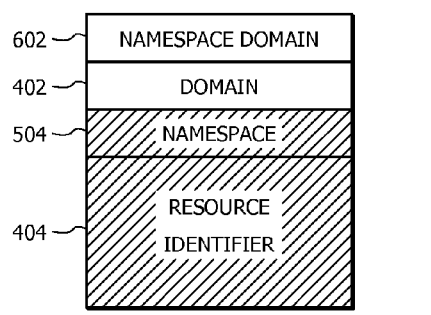
FIG. 6 is a schematic diagram of an embodiment of an IDB comprising a namespace domain field.

FIG. 6 is a schematic diagram of another embodiment of an IDB 600. IDB 600 may be used when more than one domain identification scheme is used to identify a domain. IDB 600 may comprise a namespace domain field 602, a domain identifier 402, a namespace field 504, and resource identifier 404. The namespace domain field 602 may indicate the namespace that corresponds to the domain identifier 402. For example, the namespace domain field 602 may represent a global namespace, such as Autonomous System Numbers or Carrier Identification Codes, while the domain identifier 402 may be an identifier value from the global namespace that uniquely identifies the domain. The various parts of an IDB (e.g. IDB 400, 500, and 600) as illustrated in FIGS. 4-6 may be encoded using TLV structures commonly used in telecommunications control protocols. Using FIG. 6 as an example, the type field of the TLV structure may represent the namespace field 504, and the value field of the TLV structure may represent the resource identifier 404.

Figure 7:
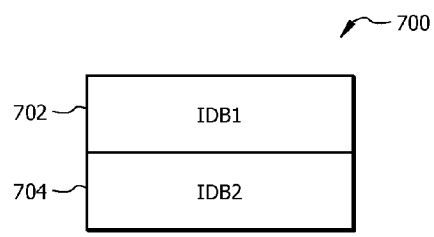
FIG. 7 is a schematic diagram of an embodiment of an LID comprising two IDB fields.
Figure 8:
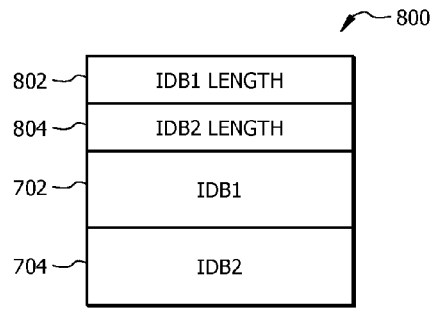
FIG. 8 is a schematic diagram of an embodiment of an LID comprising IDB length fields.

FIGS. 7 and 8 are schematic diagrams of embodiments of LID 700 and 800. In one embodiment, LID 700 may comprise an IDB1 field 702 and an IDB2 field 704. IDB1 field 702 and IDB2 field 704 may represent IDBs with any one of the embodiments as described in FIGS. 4-6. The LID 700 may be created by concatenating two IDBs from different domains. One of the IDBs may be represented by IDB1 field 702 and the other IDB may be represented by IDB2 field 704. In another embodiment, LID 800 in FIG. 8 may comprise an IDB1 length field 802, IDB2 length field 804, IDB1 field 702, and IDB2 field 704. The IDB1 length field 802 may indicate the length (e.g. in bytes) of the IDB1 field 702, while IDB2 length field 804 may indicate the length of the IDB2 field 704. Although FIGS. 7 and 8 illustrate creating LIDs with two IDBs, other embodiments may create LIDs with more than two IDBs from more than two different domains.

Figure 9:
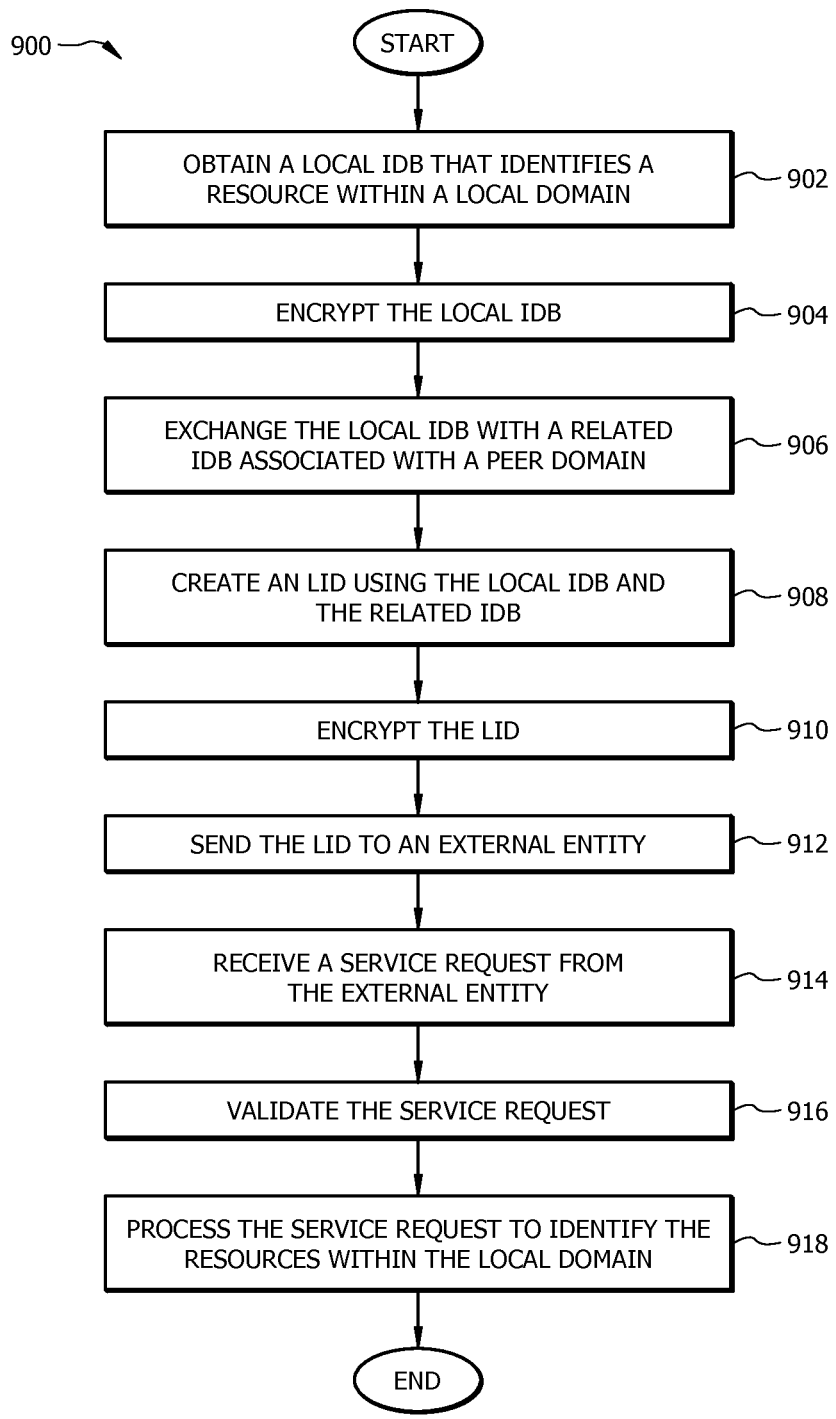
FIG. 9 is a flowchart of an embodiment of a method used to create, encrypt, and authenticate IDBs and LIDs.

FIG. 9 is a flowchart of an embodiment of a method 900 used to create, encrypt, and authenticate IDBs and LIDs. Method 900 may be implemented within a management entity and/or other network nodes within a domain. Method 900 may be used to create service instances that cross multiple domains without modifying or extending existing identifier schemes across the domains. Each of the domains may use distinct identification schemes without making any changes to create the IDBs and LIDS. The IDBs and LIDs may be sent to external entities located outside the domain. IDBs and LIDs may be encrypted and authenticated within the domain to protect private information and prevent external entities from gaining additional knowledge about the identification schemes implemented by a domain.

Method 900 may start at block 902 and obtain a local IDB that identifies a resource within a local domain. Method 900 may obtain a local IDB by creating an IDB using IDB related information received from other network nodes within the local domain. Alternatively, method 900 may obtain the local IDB by receiving the advertised IDB from other network nodes within the local domain. In one embodiment, method 900 may provide an IDB representing a specific external interface to a peer domain and/or provide an IDB representing a set of external interfaces to the peer domain. Providing a set of external interfaces (e.g. a domain interface identifier that maps to a plurality of external interfaces) may avoid revealing the number of interfaces to a peer domain and/or retain the option to select which external interface may be used to satisfy a request. Method 900 may use identification schemes within the local domain that differ or are not used in other domains.

Method 900 may then move to block 904 and encrypt the local IDB. The local IDB may be encrypted so that the IDBs are not readable by external entities and/or other domains. Method 900 may encrypt the LID using a cryptographic key that hides some or all of the local IDB. Method 900 may also use an authentication field for authenticating a sender that returns the IDB back to the local domain. In one embodiment, the local IDB may be encrypted and authenticated according to a security method identified by a SPI. Persons of ordinary skill in the art are aware that a variety of security methods may be identified by a SPI. Encrypting and authenticating the IDB will be discussed in more detail below.

Method 900 may move to block 906 and exchange the local IDB with a related IDB associated with a peer domain. At block 906, method 900 may exchange IDB information by transmitting the local IDB to a peer domain and receiving the related IDB from the domain that received the local IDB. Method 900 may then proceed to block 908 and create an LID using the local IDB and the related IDB. As discussed above, the LID may be created by concatenating the local IDB with the related IDB. In one embodiment, the LID may be arranged in lexicographical order. Afterwards, method 900 may continue to block 910 and encrypt the LID. Encrypting and authenticating the LID for linkage between two domains may prevent spoofing. Method 900 may encrypt the LID using a cryptographic key that hides some or all of the LID. Method 900 may also include an authentication field within the LIDs to authenticate LIDs returned to the local domain.

Method 900 may continue to block 912 and send (e.g. transmit) the LID to an external entity. Recall, the external entity may be located outside the local domain and may send (e.g. transmit) a service request to the local domain. Method 900 may then move to block 914 to receive a service request from the external entity. The service request may comprise the LID previously sent to the external entity at block 912. Once method 900 completes block 914, method 900 moves to block 916 and validates the service request. Method 900 may use the authentication field encoded in the LID and/or IDB to authenticate the external entity that sent the server request. Additionally, method 900 may decrypt the LID and/or IDB content within the server request using a cryptographic key. In one embodiment, the authentication and decryption of the LID and/or IDB content may proceed using one or more security methods indexed by a SPI.

Afterwards, method 900 may move to block 918 and process the service request to identify the resources within the local domain. Method 900 may process the request by decoding the LID. Method 900 may search for an IDB that matches its own domain identifier (e.g. domain identifier 402) and then decode the IDB. In instances when the IDB represents a set of external interfaces, method 900 may consult with the peer domain to identify the external interface for the service request. Other IDBs within the LID that do not match the domain identifier for the local domain may be ignored and may not be decoded by method 900.

Figure 10:
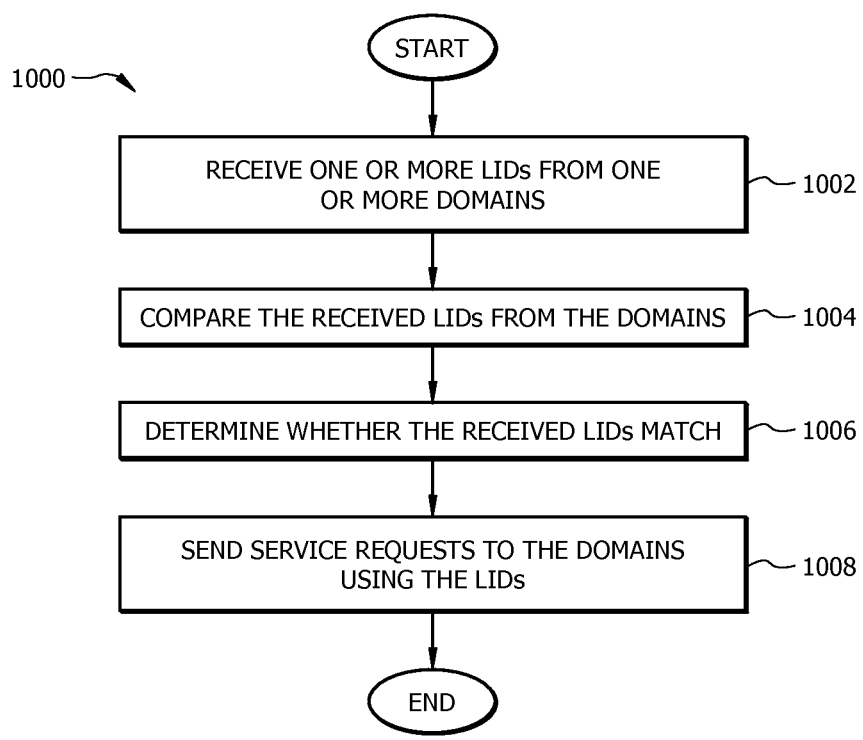
FIG. 10 is a flowchart of an embodiment of a method used to compare LIDs.

FIG. 10 is a flowchart of an embodiment of a method 1000 used to compare LIDs. Method 1000 may be implemented in an external entity, such as a service orchestration system, to compare and determine whether the advertised LIDs received from two or more domains match. Method 1000 may coordinate provisioning services across multiple domains without decoding and/or validating any part of a LID and/or the IDBs. In other words, method 1000 may not understand the identification schemes for the domains when provisioning services across multiple domains. By comparing the LIDs and determining which LIDs match, method 1000 may discover the inter-domain topology. In one embodiment, method 1000 may treat the LID as a general identifier for connections between domains.

Method 1000 starts at block 1002 and receives one or more LIDs from one or more domains. The LIDs received from the domains may be independent of each of other. Method 1000 may then move to block 1004 and compare the received LIDs from the domains. In one embodiment, method 1000 may implement a bit-by-bit comparison between two LIDs. Method 1000 may continue to block 1006 to determine whether the LIDs match. For example, method 1000 may determine the LIDs match when the bits used to represent the two LIDs match. Method 1000 may determine that two domains are linked together when the LIDs received from the two domains match. Afterwards, method 1000 may move to block 1008 and send (e.g. transmit) service requests that comprise one of the LIDs to the domains when the LIDs are determined to match. The LID sent via the service request may identify external interfaces and/or other resources within the domains.

Figure 11:
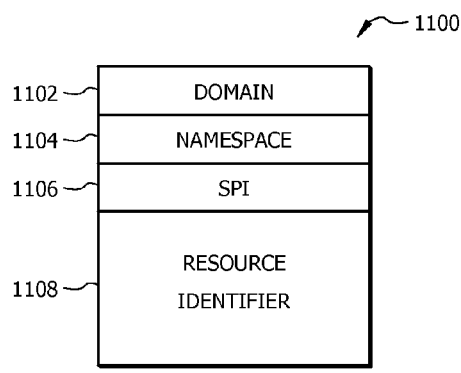
FIG. 11 is a schematic diagram of an embodiment of an authenticated and/or encrypted IDB with a security parameter index (SPI) field preceding a resource identifier.
Figure 12:
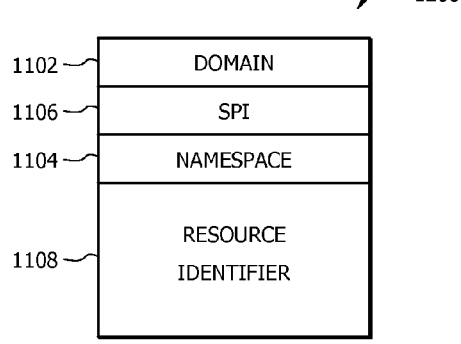
FIG. 12 is a schematic diagram of another embodiment of an authenticated and/or encrypted IDB with a SPI field preceding a namespace field.
Figure 13:
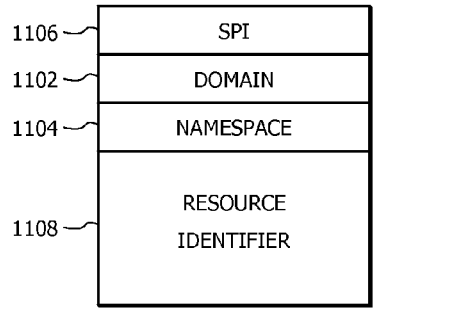
FIG. 13 is a schematic diagram of another embodiment of an authenticated and/or encrypted IDB with a SPI field preceding a domain identifier.

FIGS. 11-13 are schematic diagrams of embodiments of authenticated and/or encrypted IDBs 1100, 1200, and 1300. In some instances, a domain administrator or operator may not want to expose internal identifiers (e.g. resource identifiers and private domain identifiers) to external entities, other domains, and/or other network nodes located outside the local domains. For example, CLLI codes are text codes that may provide the location of equipment in carrier networks. A domain administrator or operator may encrypt some portion or all of an IDB. In one embodiment, the encrypted portion of an IDB may include all of the IDB except the public domain identifier. In another embodiment, the domain identifier may also be encrypted with the rest of the IDB when the domain identifier is private and the encryption scheme is well-known. A domain administrator or operator may also want to authenticate the sender (e.g. external entity) of the IDBs when the IDBs are returned back to a domain (e.g. step 5 in FIG. 2 and block 914 in FIG. 9). IDBs may include an authentication field in the IDB for authenticating IDBs sent back from the external entity and/or network nodes located outside the local domain. A variety of authentication and/or encryption schemes that are well-known in the art may be used to authenticate and/or encrypt IDBs.

FIGS. 11-13 illustrate that IDBs 1100, 1200, and 1300 may be authenticated and/or encrypted according to a security method identified by a SPI, and thus may be encoded as IP data packets. IDBs 1100, 1200, and 1300 may comprise a domain identifier 1102, namespace field 1104, a SPI field 1106 and a resource identifier 1108. The domain identifier 1102, namespace field 1104, and resource identifier 1108 may be substantially similar to the domain identifier 402, namespace field 504, and resource identifier 404 as described in FIG. 5, respectively. The SPI field 1106 may be used to identify the Security Association for the nodes that process the IDB. Using FIG. 1, as an example, when management entity A 104 receives a service request 114, the management entity A 104 may use the SPI field 1106 to authenticate and/or decrypt the IDB with a domain identifier 1102 that identifies domain A 102. Typically, the Security Association may be a connection that provides security services to obtain cryptographic information used to authenticate and extract the encrypted IDB. The Security Association may provide one or more cryptographic algorithms, shared keys (e.g. Advanced Encryption Standard (AES) key) and/or other parameters used to authenticate, encrypt, and/or decrypt IDB 1100. Encrypting IDBs may not affect the use of IDBs in LIDs because the IDBs' content may not be understood during the LID process (e.g. creating, encrypting, and decrypting LIDs).

In FIGS. 11-13, the SPI field 1106 may precede the encrypted and/or authenticated content. In other words, the SPI field 1106 may be located outside the encrypted and/or authenticated content of the IDB. For FIG. 11, the SPI field 1106 precedes the resource identifier 1108, and thus the resource identifier 1108 may be authenticated and encrypted content, while the domain identifier 1102 and namespace field 1104 may not be encrypted or authenticated. FIG. 12 illustrates that the SPI field 1106 may precede the resource identifier 1108 and the namespace field 1104. Hence, the resource identifier 1108 and namespace field 1104 may be authenticated and encrypted content, while the domain identifier 1102 may not be encrypted or authenticated. FIG. 13 illustrates that the SPI field 1106 may precede the resource identifier 1108, the namespace field 1104, and the domain identifier 1102. As such, in FIG. 13, the encrypted and authenticated content may include the resource identifier 1108, the namespace field 1104, and the domain identifier 1102. Other embodiments may encrypt and authenticate IDB structures as described in FIGS. 4 and 6 (e.g. IDB 400 and IDB 600).

Figure 14:
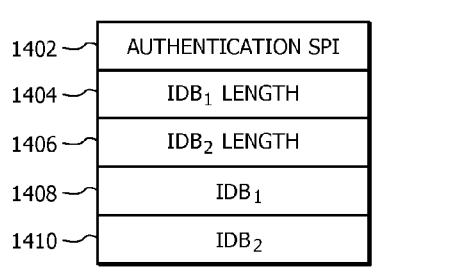
FIG. 14 is a schematic diagram of an embodiment of an authenticated LID.

FIG. 14 is a schematic diagram of an embodiment of an authenticated LID 1400. The LID 1400 may comprise an Authentication SPI field 1402, an IDB1 length field 1404, an IDB2 length field 1406, an IDB1 field 1408, and an IDB2 field 1410. The IDB1 length field 1404, IDB2 length field 1406, IDB1 field 1408, and IDB2 field 1410 may be substantially similar to the IDB1 length field 802, IDB2 length field 804, IDB1 field 702, and IDB2 field 704 as described in FIG. 8, respectively. The authentication SPI may be an SPI provided by a sender, such as external entity 108 in FIG. 1. The receiver of LID 1400, such as the management entity 104, may receive the LID 1400 and use the Authentication SPI field 1402 to authenticate the LID 1400. The authentication SPI field 1402 may precede the authenticated content for an LID 1400. In FIG. 14, IDB1 length field 1404, IDB2 length field 1406, IDB1 field 1408, and IDB2 field 1410 may represent the authenticated content.

Figure 15:
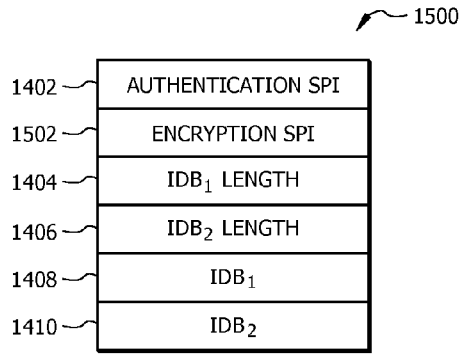
FIG. 15 is a schematic diagram of an embodiment of an authenticated and encrypted LID.

FIG. 15 is a schematic diagram of an embodiment of an authenticated and encrypted LID 1500. The LID 1500 may comprise an Authentication SPI field 1402, an Encryption SPI field 1502, an IDB1 length field 1404, an IDB2 length field 1406, an IDB1 field 1408, and an IDB2 field 1410. The Encryption SPI field 1502 may be used to encrypt content within the LID 1500. The receiver of the LID 1500, such as the management entity 104, may use the encryption SPI field 1502 to determine the cryptographic key to decrypt the encrypted content. The IDB1 field 1408 and IDB2 field 1410 may have their own SPI and cryptographic keys (e.g. not Authentication SPI field 1402 and Encryption SPI field 1502) to decrypt the content of the IDB1 field 1408 and IDB2 field 1410. Other embodiments may authenticate and/or encrypt LIDs that comprise more than two IDBs.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for identifying resources in an inter-domain service request, comprising:
    obtaining a first identifier block (IDB) that identifies a first resource within a first domain, wherein the first domain is a first network under the control of a first management entity, and wherein the first IDB comprises a first domain identifier and a first resource identifier;
    obtaining a second IDB that identifies a second resource within a second domain, wherein the second domain is a second network under the control of a second management entity, and wherein the second IDB comprises a second domain identifier and a second resource identifier;
    creating a linked identifier (LID) that comprises the first IDB and the second IDB, wherein the LID identifies two service points in an inter-domain service request; and
    advertising the LID to an external entity, wherein the external entity coordinates the inter-domain service request.

2. The method of claim 1, further comprising encrypting at least some portion of the first IDB.

3. The method of claim 1, further comprising encrypting the LID according to a security method identified by a Security Parameter Index.

4. The method of claim 1 wherein the first resource identifier follows a first identifying scheme, wherein the second resource identifier follows a second identifying scheme, and wherein the first identifying scheme is different from the second identifying scheme.

5. The method of claim 1, wherein creating the LID that comprises the first IDB and the second IDB comprises concatenating the first IDB and the second IDB in a lexicographical order.

6. The method of claim 1, wherein the first domain identifier is an autonomous system number.

7. The method of claim 1, wherein the first domain identifier is a carrier identification code.

8. An apparatus within a first domain processing a link identifier (LID), comprising:
    a memory;
    a processor coupled to the memory, wherein the memory includes instructions that when executed by the processor cause the apparatus to perform the following:
        receive the LID, wherein the LID comprises a first identifier block (IDB) and a second identifier block (IDB), wherein the first IDB identifies a first resource within the first domain, wherein the first domain is a first network under the control of a first management entity, and wherein the first IDB comprises a first domain identifier and a first resource identifier, and wherein the second IDB identifies a second resource within a second domain, wherein the second domain is a second network under the control of a second management entity, and wherein the second IDB comprises a second domain identifier and a second resource identifier;
        search for the first IDB within the LID that identifies the first domain; and
        decode the first IDB to identify the first resource identifier,
    wherein the processor is unable to decode the second resource identifier in the second IDB.

9. The apparatus of claim 8, wherein the instructions executed by the processor further cause the apparatus to receive the LID via a service request.

10. The apparatus of claim 8, wherein the instructions executed by the processor further cause the apparatus to decode the LID using a LID Security Parameter Index and decode the IDB using an IDB Security Parameter Index.

11. The apparatus of claim 8, wherein the first domain identifier is an autonomous system number.

12. The apparatus of claim 8, wherein the first domain identifier is a carrier identification code.

13. The apparatus of claim 8, wherein the first resource identifier is encrypted and the instructions executed by the processor further cause the apparatus to decrypt the first resource identifier.

14. The apparatus of claim 8, wherein the second resource identifier is encrypted and the processor lacks sufficient information to decrypt the second resource identifier.

15. The apparatus of claim 8, wherein the first IDB and the second IDB have been concatenated in a lexicographical order to form the LID.

16. A first network element for providing an inter-domain service request, comprising:
   a first identifier block (IDB), wherein the first IDB identifies a first resource within a first domain, wherein the first domain is a first network under the control of a first management entity, and wherein the first IDB comprises a first domain identifier and a first resource identifier;
   a second IDB, wherein the second IDB identifies a second resource within a second domain, wherein the second domain is a second network under the control of a second management entity, and wherein the second IDB comprises a second domain identifier and a second resource identifier;
   a linked identifier (LID), wherein the LID comprises the first IDB and the second IDB, and wherein the LID identifies two service points in the inter-domain service request;
   a network interface, wherein the network interface connects the first network element to a second network element, wherein the network interface connects the first network element to an orchestration system, and wherein the orchestration system coordinates the inter-domain service request provided by the first network element and the second network element; and
   a processor coupled to the network interface, wherein the processor is configured to:
   create the first IDB;
   receive the second IDB from the second network element using the network interface;
   create the LID by concatenating the first IDB and the second IDB; and
   send the LID to the orchestration system using the network interface.

17. The first network element of claim 16, wherein the first domain identifier is an autonomous system number.

18. The first network element of claim 16, wherein the first domain identifier is a carrier identification code.

19. The first network element of claim 16, wherein the processor is further configured to encrypt the first resource identifier when it creates the first IDB.

20. The first network element of claim 16, wherein the second resource identifier is encrypted and wherein the processor lacks sufficient information to decrypt the second resource identifier before the processor creates the LID.

* * * * *

UNITED STATES PATENT AND TRADEMARK OFFICE
CERTIFICATE OF CORRECTION

PATENT NO. : 9,647,876 B2  
APPLICATION NO. : 14/059055  
DATED : May 9, 2017  
INVENTOR(S) : T. Benjamin Mack-Crane et al.

Page 1 of 1

It is certified that error appears in the above-identified patent and that said Letters Patent is hereby corrected as shown below:

In the Claims

Column 14, Lines 36-60, Claim 8, should read:
8. An apparatus within a first domain for processing a link identifier (LID), comprising:
    a memory;
    a processor coupled to the memory, wherein the memory includes instructions that when executed by the processor cause the apparatus to perform the following:
        receive the LID, wherein the LID comprises a first identifier block (IDB) and a second identifier block (IDB), wherein the first IDB identifies a first resource within the first domain, wherein the first domain is a first network under the control of a first management entity, and wherein the first IDB comprises a first domain identifier and a first resource identifier, and wherein the second IDB identifies a second resource within a second domain, wherein the second domain is a second network under the control of a second management entity, and wherein the second IDB comprises a second domain identifier and a second resource identifier;
        search for the first IDB within the LID that identifies the first domain; and
        decode the first IDB to identify the first resource identifier,
    wherein the processor is unable to decode the second resource identifier in the second IDB.

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*